United States Patent [19]

Walters, Jr.

[11] Patent Number: 4,841,279

[45] Date of Patent: Jun. 20, 1989

[54] CMOS RAM DATA COMPARE CIRCUIT

[75] Inventor: Donald M. Walters, Jr., Austin, Tex.

[73] Assignee: Advanced Micro Devices, Inc., Sunnyvale, Calif.

[21] Appl. No.: 115,130

[22] Filed: Oct. 30, 1987

[51] Int. Cl.[4] .............................................. G06F 7/02
[52] U.S. Cl. .................................................. 340/146.2
[58] Field of Search ............................... 307/450–453; 340/146.2

[56] References Cited

U.S. PATENT DOCUMENTS 4,694,274 9/1987 Shimada et al. ................. 340/146.2

Primary Examiner—Gary V. Harkcom
Assistant Examiner—Long Thanh Nguyen
Attorney, Agent, or Firm—Davis Chin

[57] ABSTRACT

A data compare circuit includes an inverter (I1), a first group (20) of series-connected transistors, a second group (20) of series-connected transistors, and a switching device (24). The switching device (24) causes a common equal line (18) to be discharged from a precharged high voltage level to a low logic level when an equality does not exist.

11 Claims, 1 Drawing Sheet

CMOS RAM DATA COMPARE CIRCUIT

CIRCUIT WAVEFORMS

CMOS RAM DATA COMPARE CIRCUIT

CROSS-REFERENCES TO RELATED APPLICATIONS

Related subject matter is disclosed in co-pending application Ser. No. 078,749 (AMD A571) entitled "Bit-Line Isolated, CMOS Sense Amplifier" which was filed on July 28, 1987, and assigned to the same assignee as the present invention.

BACKGROUND OF THE INVENTION

This invention relates generally to semiconductor integrated circuits and more particularly, it relates to a comparator circuit for use with a CMOS RAM (random access memory) to check the equality of a bit field in an accessed RAM word against an arbitrary data value.

As is generally known, comparator circuits are used in the art to check the equality of two or more signal vectors. One type of comparator circuit is referred to as a static compare circuit. This type suffers from the disadvantage that it requires a relatively large number of components or stages which reduces its speed of operation. Another type is referred to as a virtual ground compare circuit. However, this latter type also has a drawback in being of relatively slow speed in operation due to the timing logic delays required to assure its reliability and due to its greater output impedance.

It would therefore be desirable to provide a comparator circuit for use with a CMOS RAM which employs a fewer number of components and operates at higher speeds so as to reduce logic delays.

SUMMARY OF THE INVENTION

Accordingly, it is a general object of the present invention to provide an improved comparator circuit for use with a CMOS RAM memory.

It is an object of the present invention to provide an improved comparator circuit for use with a CMOS RAM in which the comparator circuit employs a fewer number of components and operates at higher speeds so as to reduce logic delays.

It is another object of the present invention to provide an improved compare circuit for use with a CMOS RAM to check the equality of a bit field in an accessed RAM word against data values at higher operating speeds, thereby reducing logic delays.

In accordance with these aims and objectives, the present invention is concerned with the provision of a data compare circuit for use with a CMOS RAM to check the equality of a bit field in an accessed RAM word against data values which includes an inverter, a first group of series-connected transistors, a second group of series-connected transistors, and a switching transistor. The inverter has an input connected to receive a true data signal and an output to provide a complementary data signal. The first group of series-connected transistors are arranged so as to receive a true sense signal at a first sense node of a sense amplifier and the true and complementary data signals. The first group of series-connected transistors generates a first high logic signal at an intermediate node when the true sense signal is at a low logic level and the true data signal is at a high logic level.

The second group of series-connected transistors are arranged so as to receive a complementary sense signal at a second sense node of the sense amplifier and the true and complementary data signals. The second group of series-connected transistors generates a second high logic signal at the intermediate node when the complementary sense signal is at a low logic level and the true data signal is at a low logic level. Both the true and complementary sense signals are precharged to a high logic level, and the true and complementary data signals are stable prior to the RAM word being accessed that results in the discharge of either the true or complementary sense signals. The switching transistor is responsive to the first and second high logic signals for generating an equal signal which is discharged from a precharged high level to a low logic level when the accessed RAM bit field and the data values are different.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
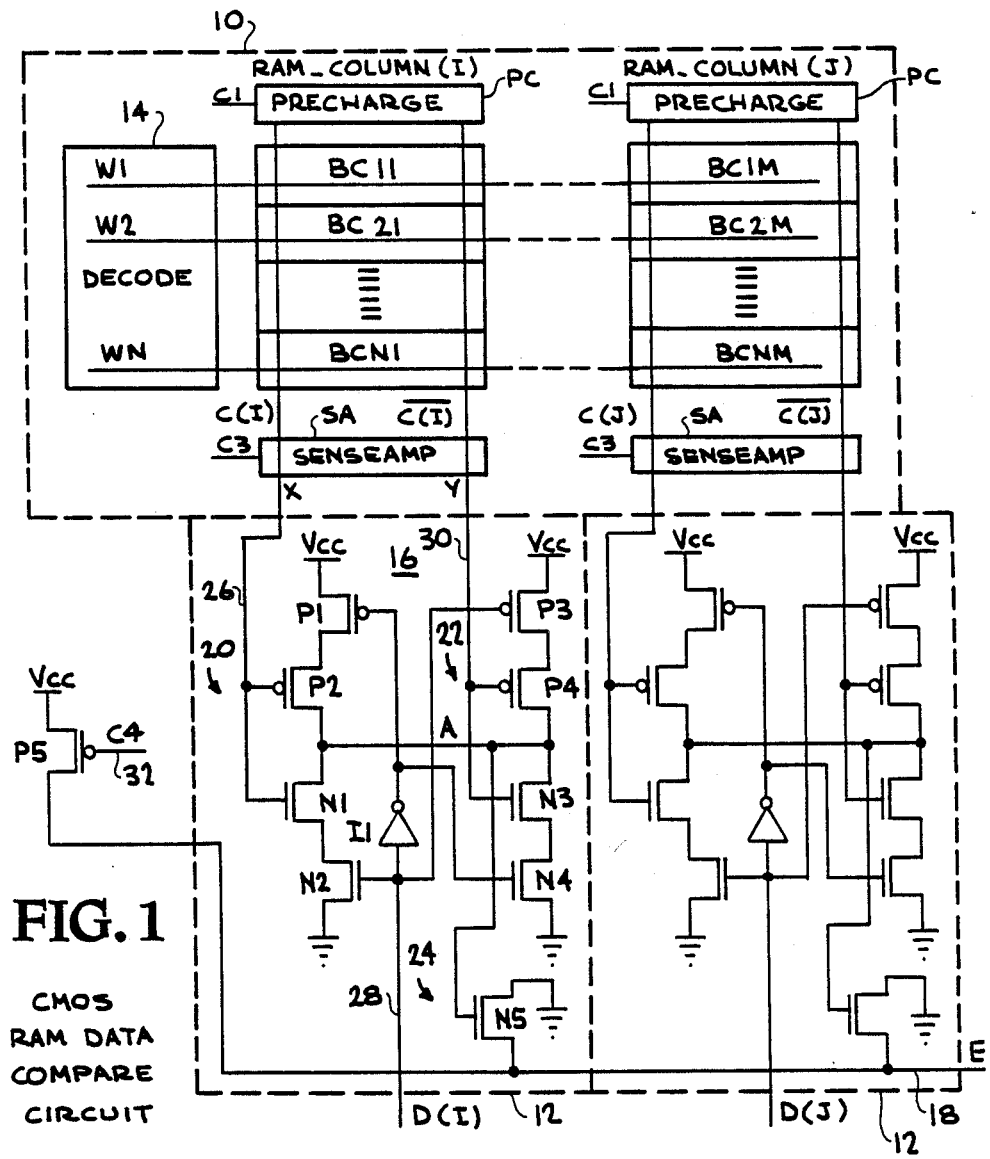
FIG. 1 is a schematic diagram of a compare circuit for use with a CMOS RAM and constructed in accordance with the principles of the present invention.

Referring now to the drawings, there is shown in FIG. 1 a schematic diagram of a portion of a random access memory (RAM) 10 and a plurality of data compare circuits 12 of the present invention connected to each column of the RAM 10 for use therewith. The RAM 10 and each of the data compare circuits 12 are preferably formed in a single semiconductor substrate by known CMOS integrated technology. The RAM 10 is generally comprised of a plurality of paired bit lines or column lines C(I), $\overline{C}$/ , . . . C(J), $\overline{C}$/ , a precharge circuit PC connected to each column, a plurality of word lines W1, W2, . . . WN connected to corresponding outputs of a row address decoder 14, and a sense amp SA connected to each of the paired column lines. In each of the RAM columns I . . . J, there are a plurality of memory or bit storage cells BC connected at the intersection between the word lines W1, W2, . . . WN and the paired bit or column lines C(I), $\overline{C}$/ , . . . C(J), $\overline{C}$/ . For example, the bit cell BC11 is arranged between the intersection of the word line W1 and the paired column lines C(I), $\overline{C}$/ . Each of the bit cells in the same row is connected to a corresponding one of the word lines. The bit cells BC11 . . . BC1M, for instance, are selected by the word line W1 from the decoder 14.

Although not especially restricted, each corresponding precharge circuit, bit cell in the columns, and sense amp of the RAM 10 may be formed of circuitry similar to the equilibration circuit 12, bit storage cell 14 and sense amplifier 16 described in detail in the co-pending application Ser. No. 078,749 (AMD A571) entitled "Bit-Line Isolated, CMOS Sense Amplifier," which is hereby incorporated by reference.

The plurality of identical data compare circuits 12 and a means for precharging a common equal line 18 serve to form a data compare network. The data compare network compares the selected RAM word (formed by all of the bit cells in a particular row) as selected by the decoder 14 with the values of the compare data signals D(I) ... D(J) on a bit-by-bit basis to determine whether there is a parity or equality in the corresponding signals as will be described more fully hereinafter. Initially, an equal signal E on the equal line 18 is precharged to a high voltage level. Upon a comparison, the equal signal E on the line 18 will be discharged if there is a mismatch in any one of the columns I ... J. On the other hand, if there is a complete match the equal signal E on the line 18 will remain at the high voltage level so as to indicate an equality. Since each of the plurality of compare circuits are identical, it will be sufficient to describe in detail only one of them.

The compare circuit 16 includes an inverter I1, a first group 20 of series-connected transistors, a second group 22 of series-connected transistors, and a switching device 24. The first group 20 consists of a P-channel transistor P1, a P-channel transistor P2, an N-channel transistor N1 and an N-channel transistor N2. The transistor P1 has its source connected to a supply voltage or potential VCC, which is typically +5.0 volts for CMOS circuitry, its drain connected to the source of the transistor P2, and its gate connected to the output of the inverter I1. The transistor P2 has its gate connected to a first sense node X of the sense amp SA via line 26 and its drain connected to an intermediate node A. The transistor N1 has its drain connected to the intermediate node A, its gate connected to the gate of the transistor P2, and its source connected to the drain of the transistor N2. The transistor N2 has its gate connected to the input of the inverter I1 and to a line 28 for receiving a true compare data signal D(I). The source of the transistor N2 is connected to a ground potential.

The second group 22 consists of a P-channel transistor P3, a P-channel transistor P4, an N-channel transistor N3, and an N-channel transistor N4. The transistor P3 has its source also connected to the supply potential VCC, its drain connected to the source of the transistor P4, and its gate connected to the line 28 for receiving the compare data signal D(I). The transistor P4 has its gate connected to a second sense node Y of the sense amp SA via line 30 and its drain connected to the intermediate node A. The transistor N3 has its drain connected to the intermediate node A, its gate connected to the gate of the transistor P4, and its source connected to the drain of the transistor N4. The transistor N4 has its gate connected to the output of the inverter I1 and its source connected to the ground potential.

The switching means 24 is formed of an N-channel transistor N5 which has its source connected to the ground potential, its gate connected to the intermediate node A, and its drain connected to the common equal line 18 for generating an equal signal E. The precharge means is formed of a P-channel transistor P5 which has its source connected to the supply potential VCC, its gate connected to a line 32 for receiving a precharge signal C4, and its drain connected to the common equal line 18.

Figure 2:
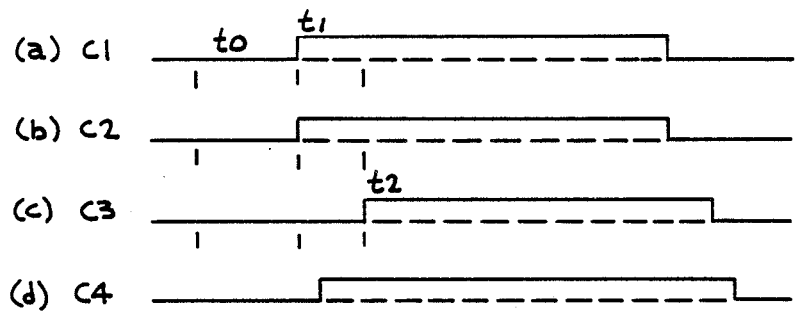
FIGS. 2(a)-2(d) are waveforms useful in understanding the operation of the compare circuit of FIG. 1.

The RAM 10 and the plurality of compare circuits 12 operate in association with a time sequence shown in the waveforms of FIGS. 2(a)-2(d). At first, all of the paired bit or column lines C(I), $\overline{C}$)/, ... C(J), $\overline{C}$)/ are precharged to the supply potential VCC by the respective precharge circuits PC at a time t0 by the precharge signal C1 as illustrated in FIG. 2(a). This equalized voltage will also appear at the first and second sense nodes X, Y of the sense amp SA. Since precharge signal C4 is applied to the gate of the precharge transistor P5, the transistor P5 will be rendered conductive so as to charge the equal signal E on the equal line 18 to a high logic level. The precharge signal C4 is depicted in FIG. 2(d). At a time t1, after all of the paired column lines have been equalized the precharge portion terminates with the signal C1 going to a high logic level.

As the precharge charge signal C1 goes to the high logic level, one of the bit cells BC in each of the columns I ... J will be accessed by an access signal C2 (FIG. 2(b)) applied to one of the word line W1 ... WN. This will cause a voltage separation at the sense nodes X and Y. At a time t2, a sense signal C3 will be applied to the sense amps for amplifying the voltage difference on the paired column lines C(I), $\overline{C}$)/, ... C(J), $\overline{C}$)/ causing them to separate further. Eventually, one of the sense nodes will be discharged to a logic "0" level and the other one will remain at a logic "1" level dependent upon whether the selected bit cell in the respective column is storing a logic "1" or "0" level. If the bit cell is storing a logic "0" level, the first sense node X will be the one to discharge to the logic "0" level. If the bit cell is storing a logic "1" level, the second sense node Y will be the one to discharge to the logic "0" level.

The operation of the compare circuit 16 will now be explained with reference to the times t0 and t2 shown in respective FIGS. 2(a) and 2(c). Assume that the bit cell BC11 in the RAM column I is storing a logic "0" level and that the true compare data signal D(I) is at a logic "1" level. Since the true compare data signal D(I) is at the logic "1" level and the complementary compare data signal $\overline{D}$)/ is at the logic "0" level (at the output of the inverter I1), the transistors P1 and N2 will be turned on and the transistors P3 and N4 will be turned off. At the time t0, both of the sense nodes X, Y on the respective lines 28, 30 will be precharged to the supply potential VCC or a logic "1" level. As a result, the transistors P2 and P4 are turned off and the transistors N1 and N3 are turned on. Therefore, the intermediate node A will be at a logic "0" level, causing the transistor N5 to be turned off.

However, at the time t2 the first sense node X will begin to discharge to the logic "0" level and will eventually turn on the transistor P2 and turn off the transistor N1. Consequently, the intermediate node A will be pulled to a high logic level via the transistors P1 and P2 so as to cause the transistor N5 to turn on. This will allow the precharged high voltage level of the equal signal E on the line 18 to discharge through the source-drain conduction path of the transistor N5 to ground. By sensing the discharge of the equal signal E on the line 18, this would indicate an inequality or mismatch.

Assume now that the bit cell BC11 in the RAM column I is storing a logic "1" level and that the true compare data signal D(I) is again at the logic "1" level. At the time t0, the "on and off" conditions of all of the transistors will be the same as described above. Accordingly, the intermediate node A will be at a logic "0" level so as to keep the transistor N5 turned off. At the time t2, the second sense node Y will begin to discharge to the logic "0" level and will eventually turn on the transistor P4 and turn off the transistor N3. However, the intermediate node A will remain at a low logic level, thereby preventing the turning on of the transistor N5. Consequently, the equal signal E on the line 18 will stay at a high logic level indicating an equality or parity condition.

Assume next that the bit cell BC11 in the RAM column I is storing a logic "0" and that the true compare data signal D(I) is at a logic "0" level. Since the true compare data signal D(I) is at the logic "0" level and the complementary compare data signal $\overline{D})/$ is at the logic "1" level, the transistors P1 and N2 will be turned off and the transistors P3 and N4 will be turned on. At the time t0, both of the sense nodes X and Y on the respective lines 28 and 30 will be precharged again to the supply potential VCC or a logic "1" level. As a result, the transistors P2 and P4 will be turned off and the transistors N1 and N3 will be turned on. Therefore, the node A will be at a logic "0" level, causing the transistor N5 to be turned off. At the time t2, the first sense node X will begin to discharge to a logic "0" level and will eventually turn on the transistor P2 and turn off the transistor N1. However, the intermediate node A will remain at a low logic level and maintain the transistor N5 in the off condition. Consequently, the equal signal E on the line 18 will remain at a high voltage level indicating a parity condition.

Finally, assume that the bit cell BC11 in the RAM column I is storing a logic "1" level and the true compare data signal D(I) is again at a logic "0" level. At the time t0, the "on and off" conditions of all the transistors will be in the same state as described in the previous paragraph. Thus, the intermediate node A will be at a logic "0" level, maintaining the transistor N5 in the non-conductive state. At the time t2, the second sense node Y will begin to discharge to the logic "0" level and will eventually turn on the transistor P4 and turn off the transistor N3. Consequently, the intermediate node A will be pulled to a high logic level via the transistors P3 and P4 so as to cause the transistor N5 to turn on. This will again allow the precharged high voltage of the equal signal E on the line 18 to discharge through the sourcedrain conduction path of the transistor N5 to ground. By sensing the discharge of the equal signal E on the line 18, this would indicate an inequality or mismatch.

In a similar manner, each of the remaining compare circuits is used to compare a corresponding bit cell in the remaining columns with the respective compare data signals so that the complete RAM word is checked for comparison on a bit-by-bit basis. If there is a mismatch in any one of the columns, the equal signal E on the line 18 will be discharged to a low level indicating a nonparity condition. As can be seen, the equal signal E has a delay which is self-timed in relation to the first and second sense nodes and is formed of only two gate delays.

From the foregoing detailed description, it can thus be seen that the present invention provides an improved comparator circuit for use with a CMOS RAM to produce high speeds of operation. The compare circuit includes an inverter, a first group of series-connected transistors, a second group of series-connected transistors, and a switching device.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A data compare circuit for use with a complementary metal-oxide-semiconductor random-access-memory (CMOS RAM) to check the equality of a bit field in an accessed RAM word against data values, said circuit comprising:

an inverter (I1) having an input connected to receive a true data signal and an output to provide a complementary data signal;

a first group of series-connected transistors formed of a first P-channel transistor (P1), a second P-channel transistor (P2), a first N-channel transistor (N1) and a second N-channel transistor (N2);

said first P-channel transistor (P1) having its source connected to a supply potential (VCC), its gate connected to the output of the inverter (I1), and its drain connected to the source of said second P-channel transistor (P2);

said second P-channel transistor (P2) having its gate connected to a first sense node (X) and its drain connected to an intermediate node (A);

said first N-channel transistor (N1) having its drain connected to the intermediate node (A), its gate connected to the first sense node (X), and its source connected to the drain of said second N-channel transistor (N2);

said second N-channel transistor (N2) having its gate connected to the input of the inverter (I1) and its source connected to a ground potential;

a second group of series-connected transistors formed of a third P-channel transistor (P3), a fourth P-channel transistor (P4), a third N-channel transistor (N3), and a fourth N-channel transistor (N4);

said third P-channel transistor (P3) having its source connected to the supply potential (VCC), its gate connected to the input of said inverter (I1), and its drain connected to the source of said fourth P-channel transistor (P4);

said fourth P-channel transistor (P4) having its gate connected to a second sense node (Y) and its drain connected to the intermediate node (A);

said third N-channel transistor (N3) having its drain connected to the intermediate node (A), its gate connected to the second sense node (Y) and its source connected to the drain of said fourth N-channel transistor (N4);

said fourth N-channel transistor (N4) having its gate connected to the output of the inverter (I1) and its source connected to the ground potential; and an N-channel switching transistor (N5) having its source connected to the ground potential, its gate connected to the intermediate node (A) and its drain connected to an output line (18) for generating an equal signal (E) which is discharged from a precharged high voltage level to a low logic level when the bit field in the accessed RAM word and the data values are different.

2. A data compare circuit as claimed in claim 1, further comprising means for precharging said output line to the precharged high voltage level.

3. A data compare circuit as claimed in claim 2, wherein precharging means comprises a P-channel transistor (P5) which has its source connected to the supply potential (VCC), its gate connected to receive a precharge signal (C4) and its drain connected to the output line (18).

4. A data compare circuit for use with a complementary metal-oxide-semiconductor random-access-memory (CMOS RAM) to check the equality of a bit field in an accessed RAM word against data values, said circuit comprising:

inverter means having an input connected to receive a true data signal and an output to provide a complementary data signal;

first sensing means being connected to receive a true sense signal at a first sense node of a sense amplifier and being responsive to said true and complementary data signals for generating a first high logic signal at an intermediate node when the true sense signal is at a low logic level and the true data signal is at a high logic level;

second sensing means being connected to receive a complementary sense signal at a second sense node of the sense amplifier and being responsive to said true and complementary data signals for generating a second high logic signal at the intermediate node when the complementary sense signal is at a low logic level and the true data signal is at a low logic level; and switching means connected to said intermediate node and being responsive to said first and second high logic signals for generating an equal signal which is discharged from a precharged high voltage level to a low logic level when the bit field in the accessed RAM word and the data values are different.

5. A data compare circuit as claimed in claim 4, wherein said first sensing means comprises a first group of series-connected transistors formed of a first P-channel transistor (P1), a second P-channel transistor (P2), a first N-channel transistor (N1) and a second N-channel transistor (N2).

6. A data compares circuit as claimed in claim 5, wherein said second sensing means comprises a second group of series-connected transistors formed of a third P-channel transistor (P3), a fourth P-channel transistor (P4), a third N-channel transistor (N3), and a fourth N-channel transistor (N4).

7. A data compare circuit as claimed in claim 6, wherein said switching means comprises an N-channel switching transistor (N5).

8. A data compare circuit as claimed in claim 7, wherein said inverter means comprises an inverter (I1).

9. A data compare network formed of a plurality of compare circuits for use with a complementary metal-oxide-semiconductor random-access-memory (CMOS RAM) to check the equality of n-bit field in an accessed RAM word against data values on a bit-by-bit basis, each of said circuits comprising:

an inverter (I1) having an input connected to receive a true data signal and an output to provide a complementary data signal;

a first group of series-connected transistors formed of a first P-channel transistor (P1), a second P-channel transistor (P2), a first N-channel transistor (N1) and a second N-channel transistor (N2);

said first P-channel transistor (P1) having its source connected to a supply potential (VCC), its gate connected to the output of the inverter (I1), and its drain connected to the source of said second P-channel transistor (P2);

said second P-channel transistor (P2) having its gate connected to a first sense node (X) and its drain connected to an intermediate node (A);

said first N-channel transistor (N1) having its drain connected to the intermediate node (A), its gate connected to the first sense node (X), and its source connected to the drain of said second N-channel transistor (N2);

said second N-channel transistor (N2) having its gate connected to the input of the inverter (I1) and its source connected to a ground potential;

a second group of series-connected transistors formed of a third P-channel transistor (P3), a fourth P-channel transistor (P4), a third N-channel transistor (N3), and a fourth N-channel transistor (N4);

said third P-channel transistor (P3) having its source connected to the supply potential (VCC), its gate connected to the input of said inverter (I1), and its drain connected to the source of said fourth P-channel transistor (P4);

said fourth P-channel transistor (P4) having its gate connected to a second sense node (Y) and its drain connected to the intermediate node (A);

said third N-channel transistor (N3) having its drain connected to the intermediate node (A), its gate connected to the second sense node (Y) and its source connected to the drain of said fourth N-channel transistor (N4);

said fourth N-channel transistor (N4) having its gate connected to the output of the inverter (I1) and its source connected to the ground potential; and an N-channel switching transistor (N5) having its source connected to the ground potential, its gate connected to the intermediate node (A) and its drain connected to an output line (18) for generating an equal signal (E) which is discharged from a precharged high voltage level to a low logic level when a corresponding bit of the n-bit field in the accessed RAM word and the data values are different.

10. A data compare circuit as claimed in claim 9, further comprising means for precharging said output line to the precharged high voltage level.

11. A data compare circuit as claimed in claim 10, wherein precharging means comprises a P-channel transistor (P5) which has its source connected to the supply potential (VCC), its gate connected to receive a precharge signal (C4) and its drain connected to the output line (18).

* * * * *